United States Patent
Ding et al.

(10) Patent No.: US 10,666,619 B2
(45) Date of Patent: May 26, 2020

(54) NETWORK ADDRESS TRANSLATION AND SERVICE AWARE RULE GENERATION

(71) Applicant: The Boeing Company, Chicago, IL (US)

(72) Inventors: Chong Ding, Riverside, CA (US); Karim El Defrawy, Santa Monica, CA (US)

(73) Assignee: THE BOEING COMPANY, Chicago, IL (US)

( * ) Notice: Subject to any disclaimer, the term of this patent is extended or adjusted under 35 U.S.C. 154(b) by 272 days.

(21) Appl. No.: 15/663,345

(22) Filed: Jul. 28, 2017

(65) Prior Publication Data

US 2019/0036882 A1  Jan. 31, 2019

(51) Int. Cl.
*H04L 29/00* (2006.01)
*H04L 29/06* (2006.01)
*H04L 29/12* (2006.01)

(52) U.S. Cl.
CPC ........ *H04L 63/0263* (2013.01); *H04L 61/256* (2013.01); *H04L 61/2514* (2013.01); *H04L 61/2517* (2013.01); *H04L 61/2557* (2013.01); *H04L 61/6068* (2013.01); *H04L 63/20* (2013.01)

(58) Field of Classification Search
CPC ............. H04L 63/0263; H04L 61/2557; H04L 61/256; H04L 63/20; H04L 29/06578; H04L 29/06986; H04L 63/0227; H04L 63/0254; H04L 61/2514; H04L 61/2517; H04L 61/6068; G06F 21/10
See application file for complete search history.

(56) References Cited

U.S. PATENT DOCUMENTS

| | | | | |
|---|---|---|---|---|
| 2010/0169475 A1* | 7/2010 | Woundy | ............... | H04L 41/0896 709/224 |
| 2012/0221955 A1* | 8/2012 | Raleigh | ................. | H04M 15/00 715/736 |
| 2015/0020152 A1* | 1/2015 | Litichever | ............... | H04L 63/14 726/1 |
| 2016/0044106 A1* | 2/2016 | Kjendal | ................ | H04L 43/028 709/225 |

OTHER PUBLICATIONS

Soldo, F., et al., "Filtering Sources of Unwanted Traffic", Information Theory and Applications Workshop, 2008, pp. 1-10, San Diego, CA, USA.

(Continued)

*Primary Examiner* — Jeffrey C Pwu
*Assistant Examiner* — Helai Salehi
(74) *Attorney, Agent, or Firm* — Gates & Cooper LLP (57) ABSTRACT

A method for generating a security policy for a network includes classifying a sample of network flows into at least one flow type selected from a group including a service flow, mirror flow, network address translation flow, and arbitrary flow; grouping the network flows based on flow type and one or more of an associated service port, source port, and destination port. Network security rules for the network are automatically generated based on the groups of network flows. The network security rules may further be transformed into a security policy and configuration files.

25 Claims, 7 Drawing Sheets

(56) References Cited

OTHER PUBLICATIONS

Soldo, F., et a., "Optimal Filtering of Source Address Prefixes: Models and Algorithms", INFOCOM 2009, IEEE, pp. 2446-2454, Rio de Janeiro, Brazil.
Pozo, S., et al., "MDA-Based Framework for Automatic Generation of Consistent Firewall ACLs with NAT", ICCSA, Part II, Jun. 2009, pp. 130-144, LNCS 5593.
El Defrawy, K., et al., "Optimal Allocation of Filters against DDoS Attacks", Information Theory and Applications Workshop, 2007, pp. 1-10, La Jolla, CA, USA.

* cited by examiner

NETWORK ADDRESS TRANSLATION AND SERVICE AWARE RULE GENERATION

BACKGROUND

The present disclosure relates generally to the field of network engineering, and more particularly to systems and methods for controlling a network security device by generating and applying filtering and network address translation controls.

Conventionally, human experts and network designers of cyber-physical systems (CPS), such as airplanes, receive specifications and user manuals that are utilized to devise controls (i.e., rules) for securing the networks within the CPS. As software is introduced and removed from the network and/or the CPS, the rules governing the security and traffic flow in/of the system may be updated. This process is inefficient and may introduce errors.

The work in background materials [1], [2], and [3] contained at the end of the Detailed Description of this present disclosure include proposed algorithms to filter out denial-of-service sources based on their source Internet Protocol (IP) addresses only. The work in background material [4] provides a language to unify firewall programming languages to help enable the automatic generation of firewall rules; however, [4] does not provide details on the exact methodology utilized to generate such rules. (See citations at the end of the Detailed Description of Illustrative Embodiments.)

SUMMARY

The present disclosure provides a system and methods that automatically generate filtering or rate limiting controls for network traffic, through the passive analysis of the traffic, that are comparable and/or complimentary to rules created by a human expert for securing, limiting and/or engineering traffic in a network. More specifically, one focus of the present disclosure is to describe methods (e.g., to be implemented in a logic system) to automatically generate (offline from captured network traffic) a set of firewall filtering controls giving access exclusively to the observed traffic.

The present disclosure is not limited to source addresses, and considers destination addresses, and the source and destination protocol port numbers, in addition to other fields. The present disclosure is mainly targeted for a network that is emulated (without attacks) before-hand, which is not the case in the work of [1], [2], and [3], as those consider enterprise networks, which are complex and are typically connected to the Internet.

The present disclosure may be integrated with the work in [4] to interface with different firewalls. That is, the present disclosure generates filtering controls that may be expressed in the language of [4], which are then utilized to program/configure different firewalls.

By recognizing that output traffic is very structured and defined by a human-understandable specification, the present disclosure automatically generates rules by analyzing the structured network traffic, which is then utilized to form the firewall controls/configuration. In contrast with other techniques, the present disclosure provides two primary benefits—more human meaningful rules and faster rule generation. When compared with manual rule creation by a human expert reading several specifications with varying degree of accuracy, the present disclosure provides tighter and more secure bounds on the resulting set of controls and makes the process more efficient.

According to an illustrative embodiment of the invention, a method for generating network security controls includes classifying a sample of network flows into at least one flow type selected from a group including a service flow, a mirror flow, a network address translation flow, and an arbitrary flow. The next step includes grouping the network flows based on flow type and one or more of an associated service port, source port, and destination port. Then, a security policy for the network is automatically generated based on the groups of network flows. The step of automatically generating network security controls may include generating rate limiting rules for the network based on the groups of network flows, and the step of generating rate limiting rules may be further based on at least one of current vehicle status, vehicle type, and vehicle usage. The step of classifying a sample of network flows may comprise recording a sample of network flows of a vehicle, e.g., recording a sample of network flows of a vehicle during operation of the vehicle.

Other features of the present disclosure are set forth below.

BRIEF DESCRIPTION OF THE DRAWINGS

To easily identify the discussion of any particular element or act, the most significant digit or digits in a reference number refer to the figure number in which that element is first introduced.

DETAILED DESCRIPTION OF ILLUSTRATION OF EMBODIMENTS

"Arbitrary flow" in this context refers to a network flow that is not characterized as a network address translation (NAT) flow, a service flow, or a mirror flow.

Classification may be performed by a "classifier" which in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; other examples of classifiers will be readily apparent to those of skill in the art, without undo experimentation.

Combining may be performed by a "combiner" which in this context refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; other examples of combiners will be evident to those of skill in the art, without undo experimentation.

Comparing may be performed by a "comparator" which in this context refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1 input2) output=val1; else if (input1>input2) output=val2; else output=val3; many other examples of comparators will be evident to those of skill in the art, without undo experimentation.

"Configuration file" in this context refers to a software program when executed implements the security policy/network security controls.

Correlation or association may be performed by a "correlator" which in this context refers to a logic element that identifies a configured association between its inputs. One examples of a correlator is a lookup table (LUT) configured in software or firmware. Correlators may be implemented as relational databases. An example LUT correlator is: |low_alarm_condition|low_threshold_value|0| |safe_condition|safe_lower_bound|safe_upper_bound| |high_alarm_condition|high_threshold_value|0|; generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Destination IP" in this context refers to the IP address of the destination of the network flow.

"Destination port" in this context refers to the port to which a network flow is sent.

"Internet Protocol (IP)" in this context refers to a set of rules governing the format of data sent over the Internet or other network.

"Layer 2 information" in this context refers to information described by the second layer of the seven-layer Open Systems Interconnection (OSI) model of computer networking. This layer is the protocol layer that transfers data between adjacent network nodes in a wide area network (WAN) or between nodes on the same local area network (LAN) segment.

"Mirror flow" in this context refers to a network flow where the source port and the destination port are identical.

"NAT flow" in this context refers to a network flow comprising either the correct source information and untranslated destination information or the correct destination information and untranslated source information.

"Network address translation (NAT)" in this context refers to a method of remapping one IP address space into another by modifying network address information in Internet Protocol (IP) datagram packet headers while they are in transit across a traffic routing device.

"Network flow" in this context refers to a sequence of packets from a source computer to a destination, which may be another host, a multicast group, or a broadcast domain.

"Network security rules" in this context refers to a security policy (see definition for Security policy)

"Port" in this context refers to an endpoint of communication in an operating system. While the term is also used for female connectors on hardware devices (see computer port), in software it is a logical construct that identifies a specific process or a type of network service.

"Range" in this context refers to a set, a set of intervals, or an interval of ports or IP addresses.

"Security policy" in this context refers to controls for computer network access and determines how policies are enforced and lays out some of the basic architecture of the company security network security environment.

"Service flow" in this context refers to a network flow of the set of network flows where the destination port or source port appears in multiple network flows.

"Service port" in this context refers to a port that either receives a plurality of flows or sends a plurality of flows.

"Source IP" in this context refers to the IP address of the source of the network flow.

"Source port" in this context refers to the port from which a network flow is sent.

Switching may be performed by a "switch" which in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; a somewhat more complicated software/firmware switch is: if (selection1==true and selection2==true) output=input1; else if (selection1==true and selection2==false) output=input2; else if (selection1 false and selection2==true) output=input3; else output=noOp; switches operate similarly to selectors in many ways, except in some cases switches may select all inputs to the output(s) not selected among inputs. Other examples of switches will be readily apparent to those having skill in the art, without undo experimentation.

In the following sections, an overview of the present disclosure is provided, including a discussion of the key goals and implementation details and advantages, and then a detailed description of illustrative embodiments is provided with reference to the drawings.

Overview

A purpose of the present disclosure is to provide a system and methods that automatically generates filtering or rate limiting controls for network traffic, through the passive analysis of said traffic, that are comparable and/or complimentary to rules created by a human expert for securing, limiting and/or engineering traffic in a network. A novel aspect of this approach is the recognition and application of the understanding that the majority of network applications are designed to output structured traffic. This may take the form of concrete algorithms/steps implemented in software or hardware as part of a system that outputs filtering rules, or configuration files for a firewall or other network element to enforce such rules.

More specifically, one focus of the present disclosure is to describe methods (to be implemented in a logic system) to automatically generate (offline from captured network traffic) a set of firewall filtering controls giving access exclusively to the observed traffic. The generation of such controls may be performed subject to a number of constraints, such as a target maximum number of allowed firewall or filtering rules. The present disclosure solves the problem of generating a tight set of such firewall filtering controls that allows only access to the observed traffic, and in addition may only allow a strict minimum of "filler" traffic to satisfy the constraint on the number of generated filtering controls. The system iteratively constructs filtering controls that are as tight as possible, until the constraints on the number of filtering controls are met.

Another purpose of the present disclosure is to automate the generation of firewall, or filtering, controls to filter network traffic. In one exemplary embodiment, filtering is a binary operation (i.e., on-off, let traffic through or not) and may also be generalized to be rate limiting (i.e., only a certain amount of certain types of traffic can be allowed through in any specific period, and if the traffic exceeds that limit it is dropped or filtered out). Such controls may be generated from observed traffic that is known not to be malicious and is considered "normal". For example, such traffic may be generated from an emulation of the operation of the network being considered, which may be an emulation of the network inside an airplane.

In certain environments, especially those in cyber-physical systems (e.g., in aircraft), firewall/filtering controls may be automatically generated based on a specific aircraft type, the usage of the aircraft and the status of the aircraft, which results in many sets of firewall/filtering controls. For example, when the aircraft is at an airport gate, a firewall/filtering control allowing communication with the tower, and/or other airport systems, but not allowing video streaming may be generated and applied to the firewall. As another example, during cruising, when the entertainment system is used by passengers, the firewall/filtering control may be changed to allow, for example, video streaming. For each of the several scenarios, different firewall controls may be automatically generated and applied for a single aircraft.

In a specific embodiment, aircraft manufacturers may incorporate the present disclosure into their network security workflow, and in the process of designing the internal networking and communication infrastructure in their platforms (i.e., airplanes, rotorcraft, unmanned aerial vehicles (UAVs), etc.). The present disclosure may automatically generate rules that provide a condensed and informative description of the traffic flows on their network. These rules may then be used to tightly restrict the traffic to those flows utilized by legitimate software (or other logic).

The disclosed system and its realization in software or other logic provides additional benefits during the development phase of systems that contain network traffic by allowing the designer to automatically determine the changes in network traffic as the software applications and versions present in the system evolve. This reduces the likelihood that security vulnerabilities and holes will remain in the firewall when old traffic patterns become deprecated and save significant time understanding the impact of new software on the network.

NAT & Service Aware Rule Generation

A purpose of the disclosed system is to utilize network traffic that is recorded during the operation of the network to automatically generate a security policy for the network. The network traffic includes data packets and their headers that are transmitted. The packets are parsed to construct the set of traffic flows. These flows are defined at Layer 3 (L3, the network layer) by <source IP, destination IP, Protocol> and at Layer 4 (L4, the transport layer) by the <source port, destination port>. Some traffic flows exist only at L3 and have no L4 information. All L4 traffic comprises L3 information. Software application traffic is usually operating using L4 transport such as Transmission Control Protocol (TCP) or User Datagram Protocol (UDP). Thus, a majority of the rules that are handled comprise L4 information. Based on data collected, typically more than 95% of the flows belong to flows defined as Service Flows. The remainder of the flows include Mirrored Flows and Arbitrary Flows.

More formally, let F be the set of all flows, IP be the set of IP address in the network, Proto be the set of network protocols, and Port be the set of valid ports. A flow f∈F is defined as:

$$f=[ip^S, ip^d, \text{proto}, \text{port}^S, \text{port}^d] \quad \text{Equation 1}$$

where $ip^S$, $ip^d \in$ IP, proto$\in$Proto and $port^S$, $port^d \square$Port.

A rule is then defined to include one or more flows. During the collection of network traffic, only allowed network traffic is assumed to be present in the system. Under this assumption, the different flows of traffic are categorized into different types before generating a compact set of controls that allow the traffic to flow. These compact controls are also constructed to enable the ease of extraction and understanding of the network traffic changes when network applications are added or removed from the system.

Drawings

Figure 1:
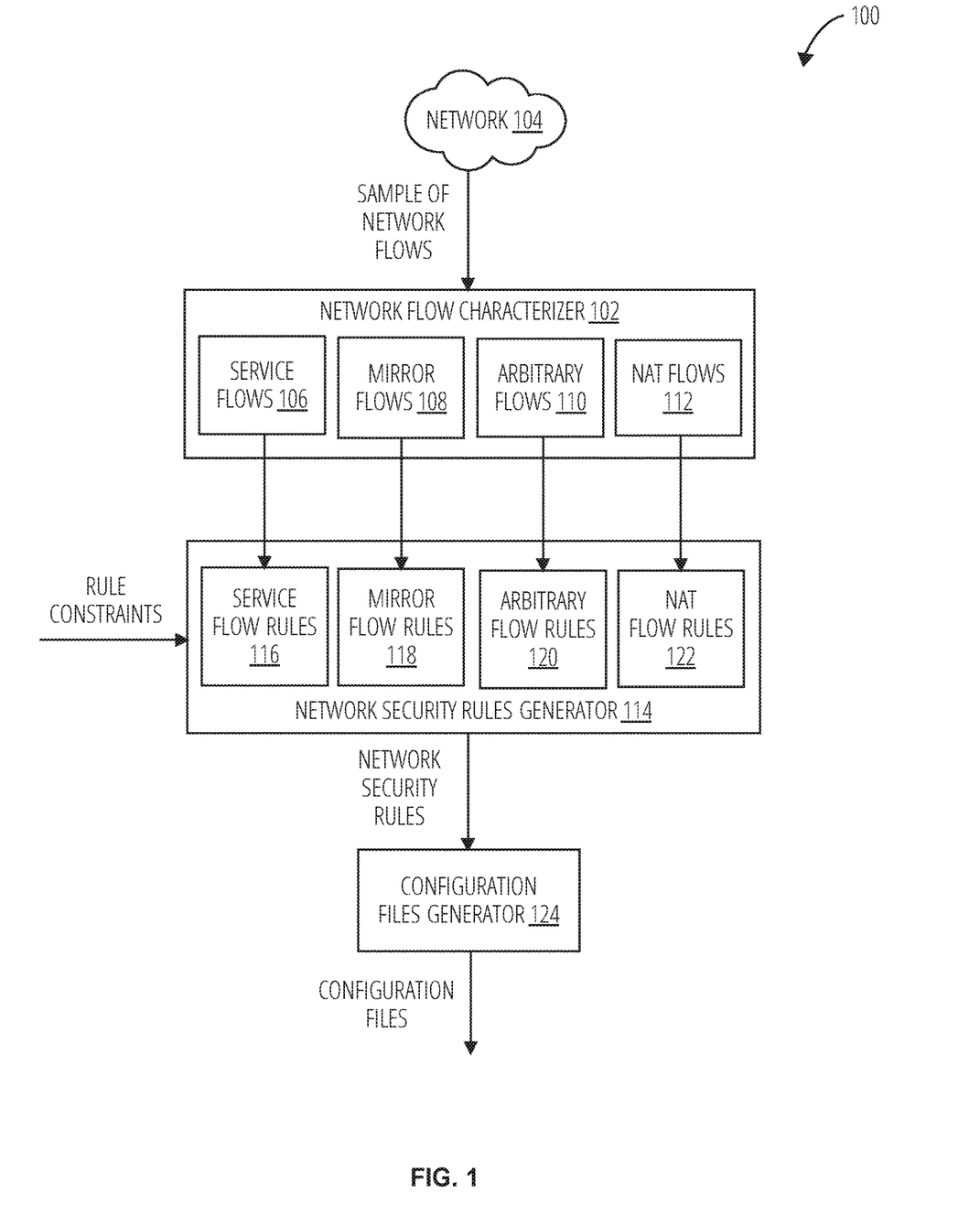
FIG. 1 illustrates an embodiment of a system data flow 100 showing different stages that raw network data goes through as it is transformed into rules that can be used to secure the network.

Referring to FIG. 1, a system data flow diagram 100 comprises a network flow characterizer 102, a network 104, a network security rules generator 114, and a configuration files generator 124. The network flow characterizer 102 comprises service flows 106, mirror flows 108, arbitrary flows 110, NAT flows 112. The network security rules generator 114 comprises service flow rules 116, mirror flow rules 118, arbitrary flow rules 120, and NAT flow rules 122.

The system data flow diagram 100 depicts different stages that raw network data goes through as it is transformed into the rules that may be utilized to secure the network. The network flow characterizer 102 receives a sample of network flows from the network 104. The sample of network flows may be network flows gathered during the operation of the network 104. The network 104 may also be emulated to provide the sample of network flows. The network 104 operated or emulated may be of a vehicle (e.g., car, airplane, etc.). The vehicle may have network flows characterized based on vehicle status, vehicle usage, and vehicle type. For example, the network flows for a specific aircraft operating with a specific software/hardware versions while in-flight may differ from those network flows with an upgraded software/hardware system or at rest at a terminal.

Figure 3:
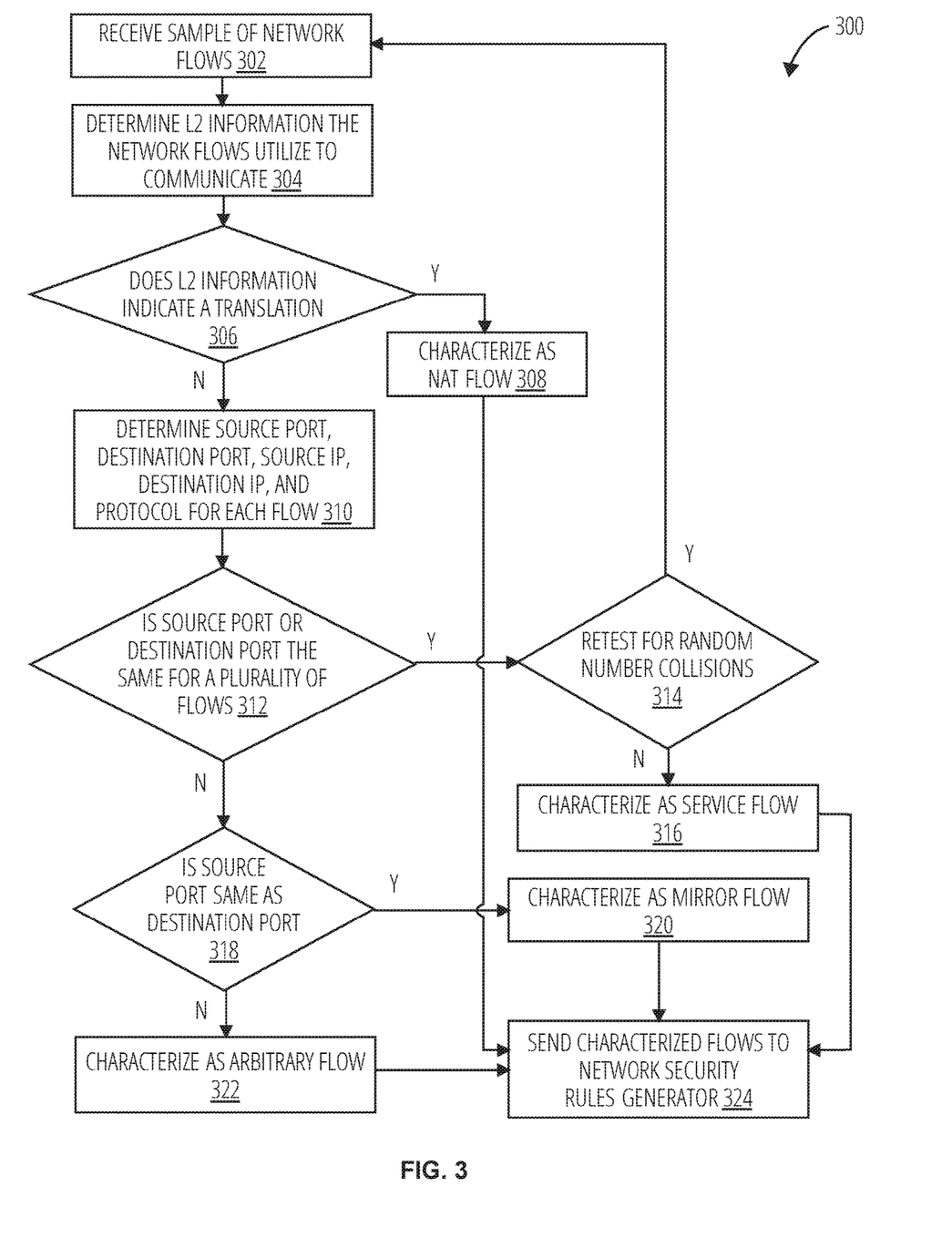
FIG. 3 illustrates an embodiment of a flow characterization process 300.

The network flow characterizer 102 then characterizes and extracts each of the network flows in the sample of network flows as service flows 106, mirror flows 108, arbitrary flows 110, or NAT flows 112. This is depicted in FIG. 3.

The service flows 106 are extracted by the network flow characterizer 102. In many applications, the traffic communication follows some extension of a client-server model. Generally, there are a small number of servers, each of which providing a service to one or more clients. The traffic generated from these services may be identified in a number of different ways. Clients utilizing a service may result in multiple transmissions to the same destination port on the same server. Each time the client creates a new connection using TCP or UDP, a different source port may be utilized; however, the destination port identifying the service may be constant. Similarly, if multiple clients connect to the same service provider, a different source port and/or source IP address may be utilized but the destination port may be constant. Service oriented traffic going to the service may be uniquely identified by its destination port, while outgoing data from the service to its clients may be uniquely identified by the same source port. Depending on the type of service, it may receive data, transmit data, or both. Thus, the service flow set, SF, may be extracted by searching for the set of network flows where the destination port or the source port appears in multiple network flows, i.e.:

$$SF=\{F_{port} \in F | |F_{port}d|>1 \text{ or } |F_{port}s|>1\} \qquad \text{Equation 2}$$

Misidentification of network flows as services may occur due to random number collisions when generating port numbers. This may be resolved by the end user when presented with the final rules and/or minimized by cross validating each potential service on a client-server basis across multiple independent runs of the system.

The mirror flows 108 are extracted by the network flow characterizer 102. Based on experimental data, there are network flows where the source port and the destination port are identical. The likely cause of this type of traffic is a prior negotiation that occurs before the system starts, such as predetermined ports in the configuration files, or negotiation in one of the existing communication channels where a new communication channel is spawned. Thus, the mirror flow set, MF, may be extracted by searching the set of network flows where the destination port and the source port are identical, i.e.:

$$MF=\{F_{port} \in F | \forall port^d \in Port, \forall port^s \in Port, port^d = port^s\} \qquad \text{Equation 3}$$

The arbitrary flows 110 are extracted by the network flow characterizer 102. The remaining network flows that are not classified as either the service flows 106 or the mirror flows 108 are labeled as the arbitrary flows 110. This set comprises the set of L3 network flows that do not have L4 information, and those few L4 network flows that effectively provide little to no additional discriminatory information in the L4 header.

The NAT flows 112 are extracted by the network flow characterizer 102. In some situations, network address translation (NAT) is performed and is handled on the machine responsible for applying the filtering controls. When this occurs, instead of one network flow with packets containers headers with the source and destination, two different network flows are obtained. One network flow comprises the correct source information and untranslated destination information, while the other has the correct destination information and untranslated source information. These may be extracted by looking at the L2 information, i.e., which interface/s the packets are using to communicate.

The network security rules generator 114 receives the extracted and characterized groups of network flows and generates network security rules based on those network flows received. The type of the network flow is utilized as context for the generation of the network security rules. The network security rules generator 114 may also receive rule constraints, such as the target maximum number of rules. The constraints may be received via user input either prior to the network security rules being generated by the network security rules generator 114 or after the network security rules have been generated. In the latter circumstance, the network security rules may be re-generated by the network security rules generator 114. The network security rules generator 114 generates the service flow rules 116, the mirror flow rules 118, the arbitrary flow rules 120, and the NAT flow rules 122. These rules may be applied as data flow controls on a network device, such as a firewall.

To generate the service flow rules 116, the service flows 106 may be separated based on the port identified as a service port. For the network flows belonging to each client-server pair of this service, the non-service port(s) may be collapsed into a range. The non-service port is the only variable with a different value across each of the network flows.

To generate the mirror flow rules 118, for the network flows belonging to each client-server pair, take the ports and collapse them into a range. The source and destination ports may be identical and share the same range. Once collapse is done, the IP source and destination addresses of the network flows are collapsed into ranges, updating the non-service port range as needed. This may be done initially only if the IP addresses follow sequentially.

The network security rules generator 114 generates the NAT flow rules 122 by describing the translation from one IP to another IP address and whether it is a source or destination address.

The network security rules generator 114 groups the service flow rules 116, the mirror flow rules 118, the arbitrary flow rules 120, and the NAT flow rules 122 to create the network security rules, which may be reviewed to alter the rule constraints. Certain network security rules may also be excluded, combined, or discarded. This information may be stored and utilized to refine the results from multiple sets of raw network data.

The configuration files generator 124 then transform the network security rules into configuration files (computer-readable memory structures comprising machine controls), which may then be sent to a device(s), such as a router or firewall, to implement the network security rules generated by the system data flow diagram 100. The network security rules may also be transformed into a security policy.

The following Table 1 is exemplary of a generated configuration file:

TABLE 1

```
<dac>
<rule>-S 172.20.30.2 -D 172.24.10.12 -p UDP -s 161:161 -d 162</rule>
<rule>-S 172.27.60.2 -D 172.24.10.12 -p UDP -s 161:161 -d 162</rule>
<rule>-S 172.24.10.8 -D 172.24.10.21 -p TCP -s 44998:44998 -d 1776</rule>
<rule>-S 172.24.10.8 -D 172.24.10.20 -p TCP -s 59975:59975 -d 1776</rule>
<rule>-S 172.24.10.21 -D 172.24.10.8 -p UDP -s 1038:1038 -d 1771</rule>
<rule>-S 172.24.10.20 -D 172.24.10.8 -p UDP -s 1033:1033 -d 1771</rule>
<rule>-S 172.24.10.8 -D 172.24.10.20 -p UDP -s 32810:60997 -d 1771</rule>
<rule>-S 172.24.10.8 -D 172.24.10.21 -p UDP -s 33861:60906 -d 1771</rule>
<rule>-S 172.24.10.21 -D 172.24.10.8 -p UDP -s 1076:2099 -d 53</rule>
```

TABLE 1-continued

```
<rule>-S 10.42.141.62 -D 172.24.10.12 -p UDP -s 60661:60661 -d 16000</rule>
<rule>-S 10.42.140.55 -D 172.24.10.12 -p UDP -s 60827:60827 -d 16000</rule>
<rule>-S 172.24.10.12 -D 172.24.10.25 -p UDP -s 1688:3599 -d 161</rule>
<rule>-S 172.24.10.12 -D 172.20.30.2 -p UDP -s 1644:3608 -d 161</rule>
<rule>-S 172.24.10.12 -D 172.20.30.5 -p UDP -s 1640:3595 -d 161</rule>
<rule>-S 172.24.10.12 -D 172.20.30.3 -p UDP -s 1641:3596 -d 161</rule>
<rule>-S 172.24.10.8 -D 172.24.10.1 -p UDP -s 32859:60951 -d 161</rule>
<rule>-S 172.24.10.53 -D 172.24.10.1 -p UDP -s 49676:65328 -d 161</rule>
<rule>-S 172.24.10.20 -D 172.24.10.8 -p UDP -s 1035:2597 -d 161</rule>
<rule>-S 172.24.10.12 -D 172.24.10.8 -p UDP -s 1689:3606 -d 161</rule>
<rule>-S 172.24.10.12 -D 172.27.60.2 -p UDP -s 1643:3594 -d 161</rule>
<rule>-S 172.24.10.12 -D 172.20.30.4 -p UDP -s 1639:3598 -d 161</rule>
<rule>-S 172.24.10.12 -D 172.20.30.6 -p UDP -s 1642:3597 -d 161</rule>
<rule>-S 172.24.10.53 -D 224.0.0.252 -p UDP -s 49675:65325 -d 5355</rule>
<rule>-S 172.24.10.53 -D 172.24.10.2 -p UDP -s 68:68 -d 67</rule>
<rule>-S 172.24.10.52 -D 255.255.255.255 -p UDP -s 68:68 -d 67</rule>
<rule>-S 0.0.0.0 -D 255.255.255.255 -p UDP -s 68:68 -d 67</rule>
<rule>-S 172.24.10.21 -D 224.224.4.18 -p UDP -s 59499:60058 -d 59499:60058</rule>
<rule>-S 172.24.10.2 -D 224.224.4.151 -p UDP -s 59858:59863 -d 59858:59863</rule>
<rule>-S 172.24.10.10 -D 224.224.4.18 -p UDP -s 58565:58595 -d 58565:58595</rule>
<rule>-S 10.42.137.18 -D 172.24.10.53 -p UDP -s 59443:59445 -d 59443:59445</rule>
<rule>-S 172.24.10.12 -D 224.224.4.25 -p UDP -s 62857 -d 62857</rule>
<rule>-S 172.24.10.2 -D 224.224.128.53 -p UDP -s 59397 -d 59397</rule>
<rule>-S 172.24.10.2 -D 224.224.252.34 -p UDP -s 61927 -d 61927</rule>
<rule>-S 172.24.10.2 -D 224.224.129.81 -p UDP -s 61803:61804 -d 61803:61804</rule>
<rule>-S 172.24.10.2 -D 224.224.130.95 -p UDP -s 59240 -d 59240</rule>
<rule>-S 10.42.141.40 -D 172.24.10.53 -p UDP -s 62098 -d 62098</rule>
<rule>-S 172.24.10.8 -D 224.224.4.18 -p UDP -s 58563:58571 -d 58563:58571</rule>
<rule>-S 172.24.10.2 -D 224.224.130.33 -p UDP -s 60823:60825 -d 60823:60825</rule>
<rule>-S 10.42.43.40 -D 172.24.10.53 -p UDP -s 61947 -d 61947</rule>
<rule>-S 172.24.10.2 -D 224.224.4.156 -p UDP -s 62444 -d 62444</rule>
<rule>-S 172.24.10.2 -D 224.224.252.53 -p UDP -s 60470 -d 60470</rule>
<rule>-S 172.24.10.2 -D 224.224.4.97 -p UDP -s 62645 -d 62645</rule>
<rule>-S 10.42.42.18 -D 172.24.10.53 -p UDP -s 59460:59461 -d 59460:59461</rule>
<rule>-S 172.24.10.2 -D 224.224.129.42 -p UDP -s 62765:62767 -d 62765:62767</rule>
<rule>-S 10.42.138.18 -D 172.24.10.53 -p UDP -s 60595:60598 -d 60595:60598</rule>
<rule>-S 10.42.138.54 -D 172.24.10.52 -p UDP -s 61999 -d 61999</rule>
<rule>-S 172.24.10.2 -D 224.224.128.114 -p UDP -s 58599 -d 58599</rule>
<rule>-S 10.42.46.15 -D 172.24.10.8 -p UDP -s 62443 -d 62443</rule>
<rule>-S 172.24.10.2 -D 224.224.130.142 -p UDP -s 62403:62411 -d 62403:62411</rule>
<rule>-S 10.42.41.54 -D 172.24.10.53 -p UDP -s 62050 -d 62050</rule>
<rule>-S 172.24.10.2 -D 224.224.129.114 -p UDP -s 62508 -d 62508</rule>
<rule>-S 10.42.141.40 -D 172.24.10.52 -p UDP -s 62097 -d 62097</rule>
<rule>-S 10.42.137.18 -D 172.24.10.52 -p UDP -s 59435:59442 -d 59435:59442</rule>
<rule>-S 172.24.10.2 -D 224.224.252.45 -p UDP -s 60579 -d 60579</rule>
<rule>-S 10.42.138.54 -D 172.24.10.53 -p UDP -s 62003 -d 62003</rule>
<rule>-S 172.24.10.2 -D 224.224.128.4 -p UDP -s 61372 -d 61372</rule>
<rule>-S 172.24.10.2 -D 224.224.252.28 -p UDP -s 61254 -d 61254</rule>
<rule>-S 172.24.10.20 -D 224.224.4.18 -p UDP -s 59570:60059 -d 59570:60059</rule>
<rule>-S 172.24.10.12 -D 224.224.4.18 -p UDP -s 58566:58594 -d 58566:58594</rule>
<rule>-S 172.24.10.2 -D 224.224.129.18 -p UDP -s 61837:61838 -d 61837:61838</rule>
<rule>-S 172.24.10.2 -D 224.224.131.170 -p UDP -s 60016 -d 60016</rule>
<rule>-S 172.24.10.53 -D 172.24.10.255 -p UDP -s 138 -d 138</rule>
<rule>-S 172.24.10.12 -D 239.192.192.1 -p UDP -s 63008 -d 63008</rule>
<rule>-S 172.24.10.2 -D 224.224.130.88 -p UDP -s 59360 -d 59360</rule>
<rule>-S 172.24.10.2 -D 224.224.130.18 -p UDP -s 59514:59515 -d 59514:59515</rule>
<rule>-S 172.24.10.2 -D 224.224.130.93 -p UDP -s 58511 -d 58511</rule>
<rule>-S 172.24.10.2 -D 224.224.4.123 -p UDP -s 62611 -d 62611</rule>
<rule>-S 10.42.43.40 -D 172.24.10.52 -p UDP -s 61946 -d 61946</rule>
<rule>-S 10.42.138.18 -D 172.24.10.52 -p UDP -s 60587:60590 -d 60587:60590</rule>
<rule>-S 172.24.10.2 -D 224.224.128.113 -p UDP -s 58596 -d 58596</rule>
<rule>-S 10.42.42.18 -D 172.24.10.52 -p UDP -s 59452:59453 -d 59452:59453</rule>
<rule>-S 10.42.137.54 -D 172.24.10.52 -p UDP -s 62061 -d 62061</rule>
<rule>-S 172.24.10.2 -D 224.224.129.14 -p UDP -s 59422 -d 59422</rule>
<rule>-S 172.24.10.2 -D 224.224.129.163 -p UDP -s 61756 -d 61756</rule>
<rule>-S 10.42.137.54 -D 172.24.10.53 -p UDP -s 62058 -d 62058</rule>
<rule>-S 172.24.10.2 -D 224.224.130.81 -p UDP -s 60901:60907 -d 60901:60907</rule>
<rule>-S 172.27.10.2 -D 224.224.4.16 -p UDP -s 62878 -d 62878</rule>
<rule>-S 10.42.40.48 -D 172.24.10.53 -p UDP -s 58860 -d 58860</rule>
<rule>-S 172.24.10.2 -D 224.224.128.220 -p UDP -s 61026 -d 61026</rule>
<rule>-S 172.24.10.2 -D 224.224.128.0 -p UDP -s 61594 -d 61594</rule>
<rule>-S 172.24.10.2 -D 224.224.131.204 -p UDP -s 59741 -d 59741</rule>
<rule>-S 172.24.10.2 -D 224.224.129.164 -p UDP -s 61732 -d 61732</rule>
```

TABLE 1-continued

```
<rule>-S 10.42.41.18 -D 172.24.10.53 -p UDP -s 63087:63089 -d 63087:63089</rule>
<rule>-S 172.24.10.2 -D 224.224.252.27 -p UDP -s 61272 -d 61272</rule>
<rule>-S 172.24.10.2 -D 224.224.128.65 -p UDP -s 59119 -d 59119</rule>
<rule>-S 172.24.10.2 -D 224.224.130.60 -p UDP -s 60994:60998 -d
60994:60998</rule>
<rule>-S 172.24.10.2 -D 224.224.132.230 -p UDP -s 58539 -d 58539</rule>
<rule>-S 172.24.10.2 -D 224.224.130.6 -p UDP -s 61989:62102 -d 61989:62102</rule>
<rule>-S 172.24.10.2 -D 224.224.130.96 -p UDP -s 59299 -d 59299</rule>
<rule>-S 10.42.41.54 -D 172.24.10.52 -p UDP -s 62055 -d 62055</rule>
<rule>-S 172.24.10.25 -D 224.224.4.18 -p UDP -s 58564:58583 -d 58564:58583</rule>
<rule>-S 172.24.10.2 -D 224.224.252.35 -p UDP -s 61955 -d 61955</rule>
<rule>-S 10.42.41.18 -D 172.24.10.52 -p UDP -s 63083:63097 -d 63083:63097</rule>
<rule>-S 172.24.10.2 -D 224.224.130.151 -p UDP -s 58637:58639 -d
58637:58639</rule>
<rule>-S 172.24.10.2 -D 224.224.130.77 -p UDP -s 60026:60028 -d
60026:60028</rule>
<rule>-S 172.24.10.53 -D 172.24.10.12 -p UDP -s 40052 -d 49300</rule>
<rule>-S 172.24.10.2 -D 172.24.10.52 -p UDP -s 67 -d 68</rule>
<rule>-S 172.24.10.12 -D 10.42.45.41 -p UDP -s 62875 -d 61924</rule>
<rule>-S 10.42.136.8 -D 172.24.10.12 -p UDP -s 59008 -d 16002</rule>
<rule>-S 172.24.10.12 -D 10.42.140.55 -p UDP -s 62875 -d 60827</rule>
<rule>-S 172.24.10.53 -D 239.255.255.250 -p UDP -s 51982 -d 1900</rule>
<rule>-S 172.24.10.12 -D 10.42.141.62 -p UDP -s 62875 -d 60661</rule>
<rule>-S 172.24.10.12 -D 10.42.45.30 -p UDP -s 62874 -d 62071</rule>
<rule>-S 172.24.10.10 -D 172.24.10.53 -p UDP -s 1036 -d 40051</rule>
<rule>-S 172.24.10.12 -D 10.42.136.8 -p UDP -s 62952 -d 59008</rule>
<rule>-S 172.24.10.25 -D 172.24.10.21 -p ICMP -t 0 -c 0</rule>
<rule>-S 172.27.20.1 -D 172.24.10.12 -p ICMP -t 3 -c 1</rule>
<rule>-S 172.24.10.20 -D 172.24.10.25 -p ICMP -t 8 -c 0</rule>
<rule>-S 172.24.10.25 -D 172.24.10.20 -p ICMP -t 0 -c 0</rule>
<rule>-S 172.24.10.21 -D 172.24.10.25 -p ICMP -t 8 -c 0</rule>
<dac>.
```

The system exemplified by data flow diagram 100 may be operated in accordance with the methods exemplified in FIGS. 2-6.

Figure 2:
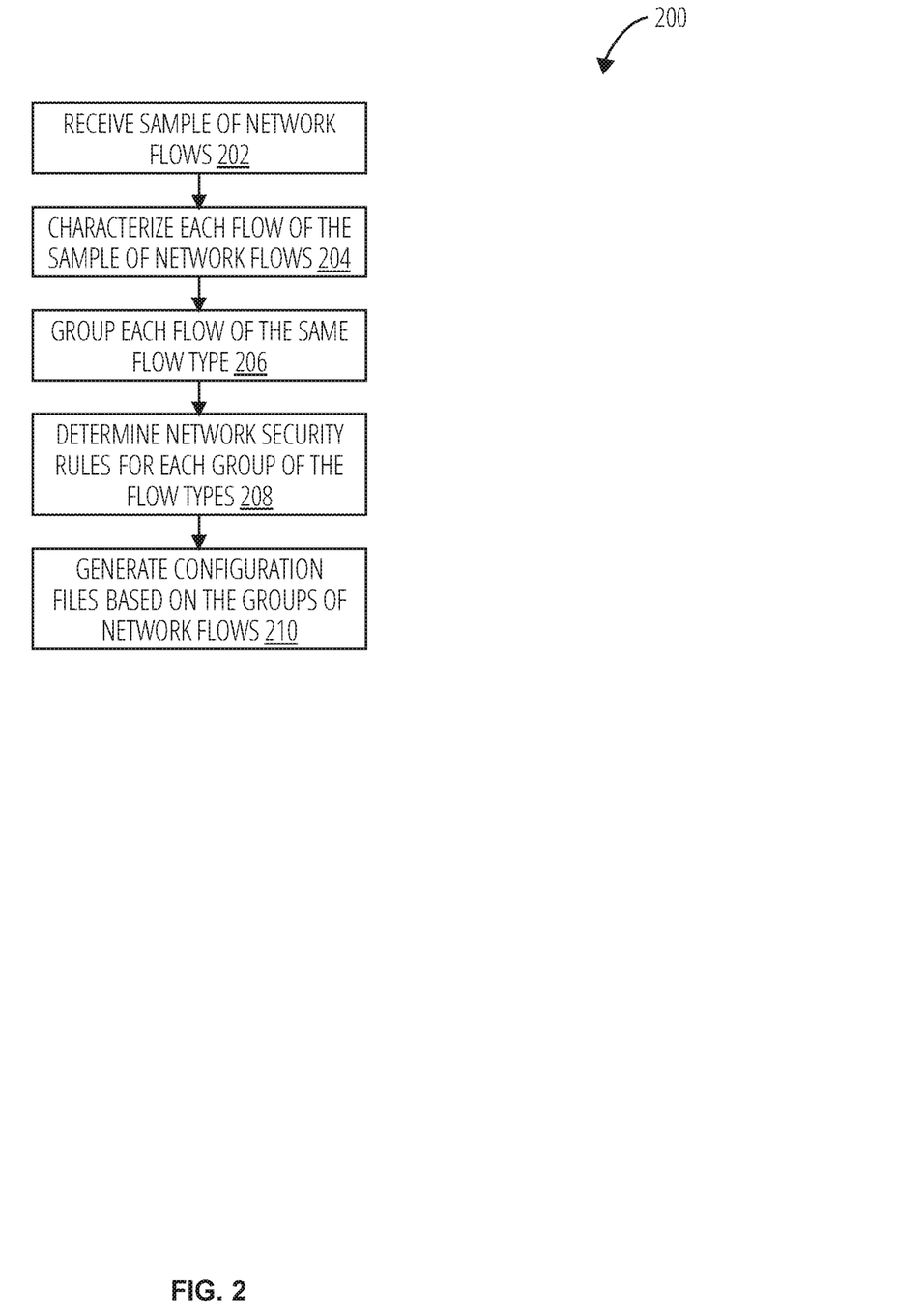
FIG. 2 illustrates an embodiment of a process 200 for generating configuration files for a network.

Referring to FIG. 2, the flow characterization process 200 receives a sample of network flows (block 202). The sample of network flows may be a set of traffic flows generated during the operation of a network. The sample of network flows may also be a set of traffic flows generated by the emulation of the operation of a network. The network and corresponding set of traffic flows may represent a vehicle. Each network flow of the sample of network flows is then characterized as a flow type (block 204). The network flow types include service flows, mirror flows, arbitrary flows, and NAT flows.

Each network flow is grouped with the same network flow type (block 206). The network flows may be further grouped by an associated service port, source port, and/or destination port. The network security rules are determined for each of the groups of network flows (block 208). The network security rules may represent a security policy for the network and may include filtering rules and rate limiting rules. The filtering rules and the rate limiting rules are based on current vehicle status, vehicle type, and/or vehicle usage. The configuration files are then generated from the network security rules for each of the groups of network flows (block 210). The configuration files may be sent to a device, such as a router, to alter the operation of the device to implement the network security rules.

Referring to FIG. 3, the flow characterization process 300 receives a sample of network flows (block 302). The sample of network flows may comprise service flows, mirror flows, arbitrary flows, and NAT flows. The Layer 2 (L2) information is determined (block 304). The L2 information may indicate that a translation (NAT) is occurring utilizing two flows. One flow comprises the correct source information and untranslated destination information, while the other flow has the correct destination information and untranslated source information. The flow characterization process 300 determines whether a translation is occurring in L2 (decision block 306). If so, those network flows are characterized as NAT flows (block 308).

If the L2 information does not indicate a translation, the source port, the destination port, the source IP, the destination IP, and the Protocol are determined for each network flow (block 310). The flow characterization process 300 determines whether the source port or the destination port is the same for a plurality of the network flows (block 312). If so, the flow characterization process 300 determine whether to re-test due to random number collisions (decision block 314). The random number collisions may result in misidentification of network flows as service flows as port numbers may be randomly generated during operation or emulation as the same number. If a re-test is determined, the flow characterization process 300 receives another sample of network flows. If not, the network flows with the same source port or same destination port are characterized as service flows (block 316).

If the source port or the destination port are not the same for a plurality of network flows, the flow characterization process 300 determines whether the source port is the same as the destination port for a network flow (decision block 318). If so, the network flow is characterized as a mirror flow (block 320).

If the source port is not the same as the destination port for a network flow, the network flow is characterized as an arbitrary flow (block 322). The characterized network flows are then sent to the network security rules generator (block 324).

Figure 4:
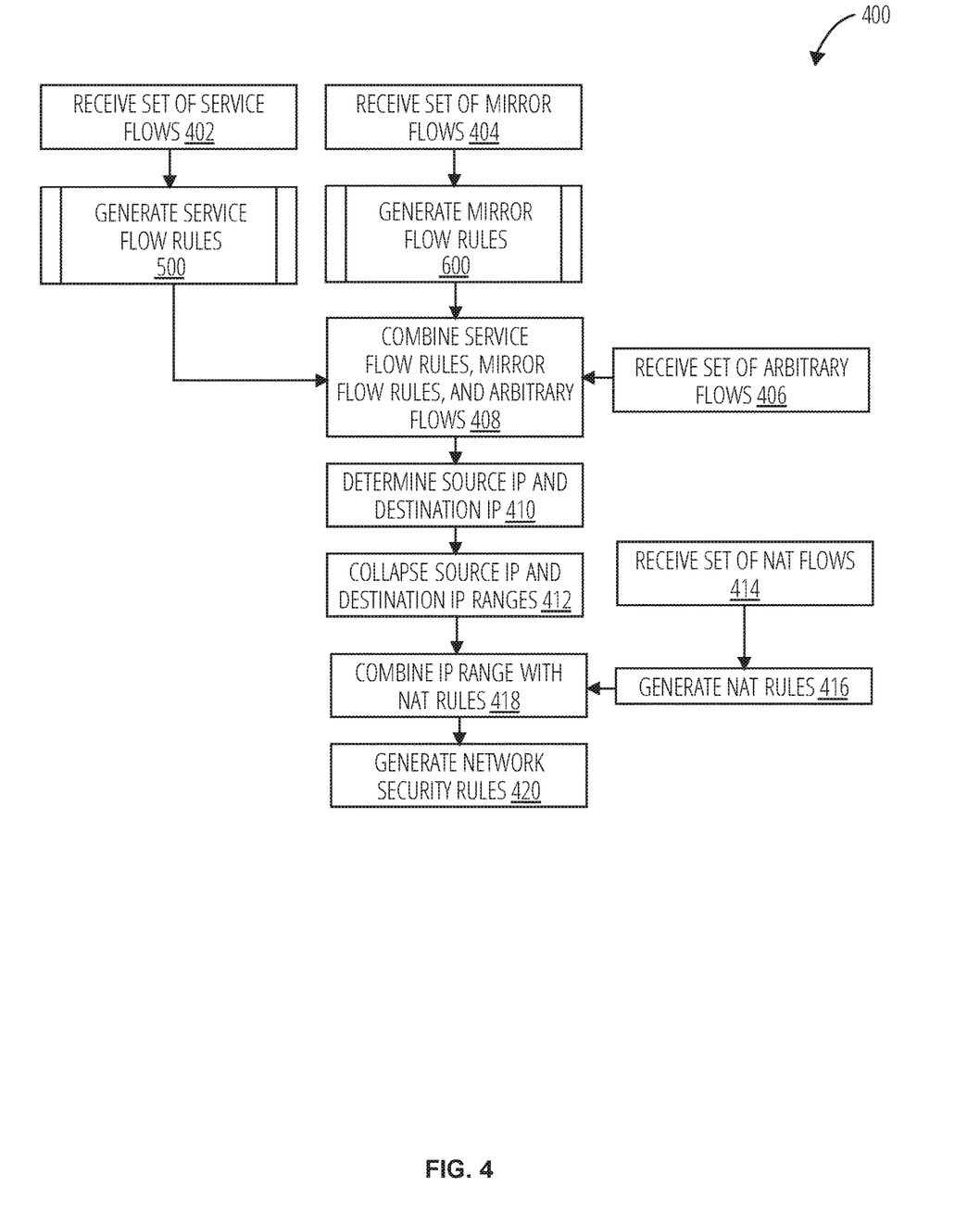
FIG. 4 illustrates an embodiment of a network security rules generation process 400.
Figure 5:
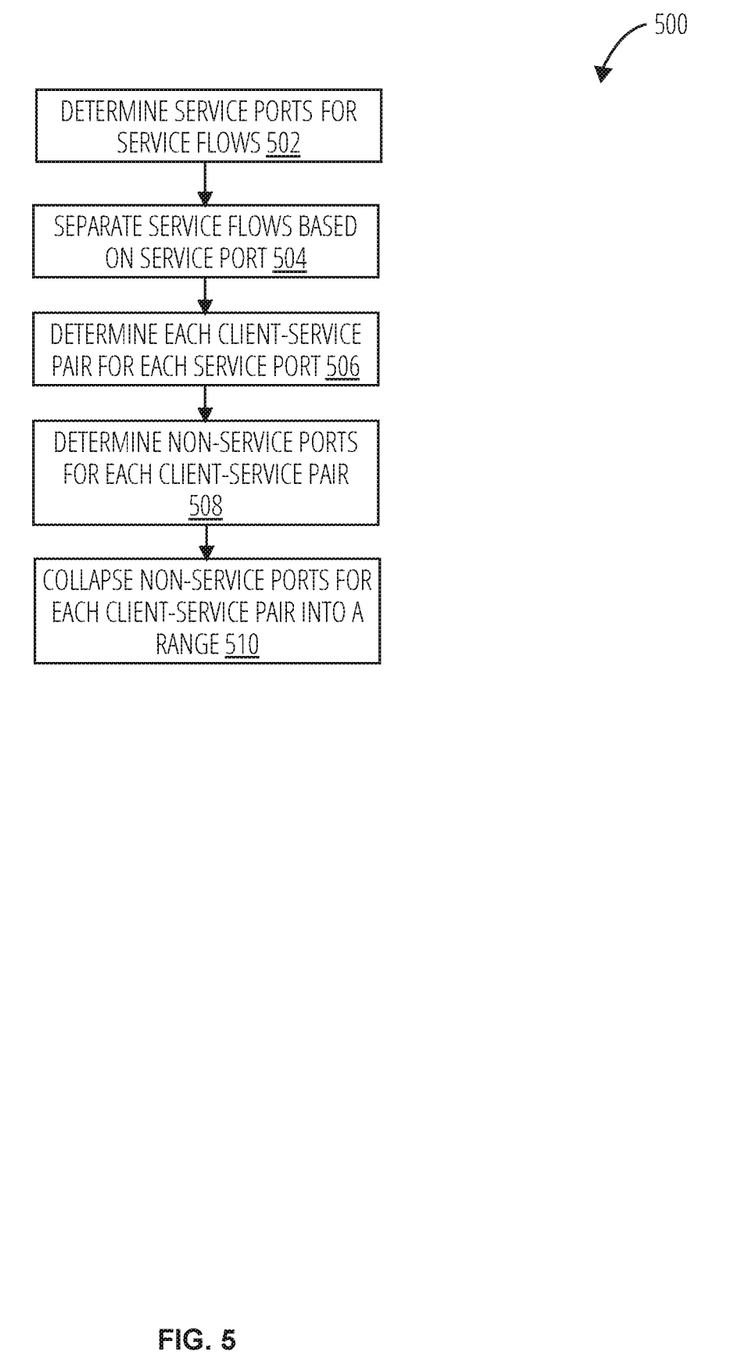
FIG. 5 illustrates an embodiment of a service flow rule generation process 500.
Figure 6:
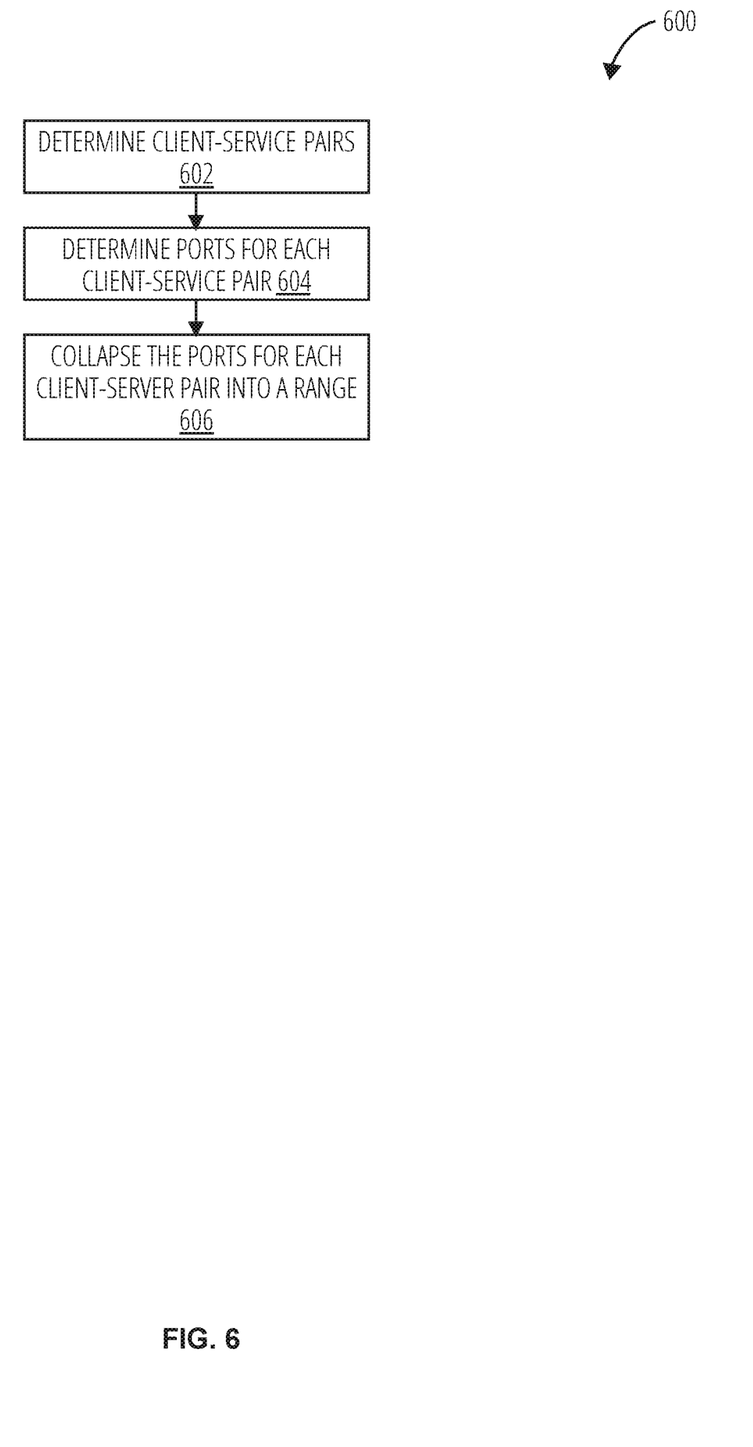
FIG. 6 illustrates an embodiment of a mirror flow rule generation process 600.

Referring to FIG. 4, the network security rules generation process 400 receives a set of service flows (block 402), a set of mirror flows (block 404), and a set of arbitrary flows (block 406). These sets of flows may be received from a network flow characterizer. Rules for the service flows and the mirror flows are generated utilizing the service flow rule generation process 500 and the mirror flow rule generation process 600. The service flow rules, the mirror flow rules, and the set of arbitrary flows are then combined (block 408). Using the service flow rules, the mirror flow rules, and the set of arbitrary flows the source IP and the destination IP are determined (block 410) and collapsed into a range (block 412). The set of NAT flows is received (block 414). NAT rules are generated (block 416). The NAT rules are based on whether the NAT flow comprises a source IP or destination IP, and the translation. The range for the source IP and the destination IP are combined with the NAT flows (block 418). The non-service port ranges, previously determined, may be updated based on the ranges. The network security rules are then generated (block 420).

The network security rules generated may be rate limiting rules, wherein a certain amount of traffic flow is allowable over a time period, and, once exceeded, the traffic flow is filtered. The network security rules may also be a specific variation of the rate limiting rules, filtering rules, whereby no amount of traffic flow is permitted over a time period. The rate limiting rules may be based on current vehicle status, vehicle type, and vehicle usage. Each vehicle status, vehicle type, and vehicle usage may result in a different sample of network flows and may have different constraints.

In some embodiments, the network security rules generation process 400 may receive constraints. The constraints may include a maximum number of rules. If so, the number of rules in the network security rules is determined and compared to the maximum number of rules. If exceeded, the service flow rule generation and the mirror flow rule generation method may be refined utilizing processes that may result in fewer rules.

In further embodiments, collapse of the source IP and the destination IP may occur only if the IP addresses are sequential. The non-service port range is then updated.

Referring to FIG. 5, the service flow rule generation process 500 determines the service ports for the service flow (block 502). The service port may be the port that either sends multiple service flows or receives multiple service flows. The service flows are then separated based on the service port (block 504). For each service port, each client-service pair is determined (block 506). Then for each client-service pair, the non-service ports are determined (block 508). The non-service ports for each client-service port are collapsed into a range (block 510).

The range may be a set of non-service ports (e.g., {1, 3, 7, 10}), a set of ranges (e.g., {1-3, 7-10}, or a range (e.g., {1-10}), or combinations thereof. The service flow rule generation process 500 may start by collapsing the non-service ports into a set. If a constraint is exceeded, the service flow rule generation process 500 may re-determine the range. The service flow rule generation process 500 may further collapse the set into a range with multiple single ports in the set, or multiple ranges. The service flow rule generation process 500 may further collapse the set into a single range.

Referring to FIG. 6, the mirror flow rule generation process 600 determines client-service pairs for each mirror flow (block 602). The ports are determined for each client-service (block 604). As each network flow is a mirror flow, the source port and the destination port are the same. The ports are then collapsed into a range (block 606).

A range is defined for a mirror flow similar to a service flow as discussed regarding FIG. 5. The range may be set initially and update in response to constraints similar to that depicted above.

Figure 7:
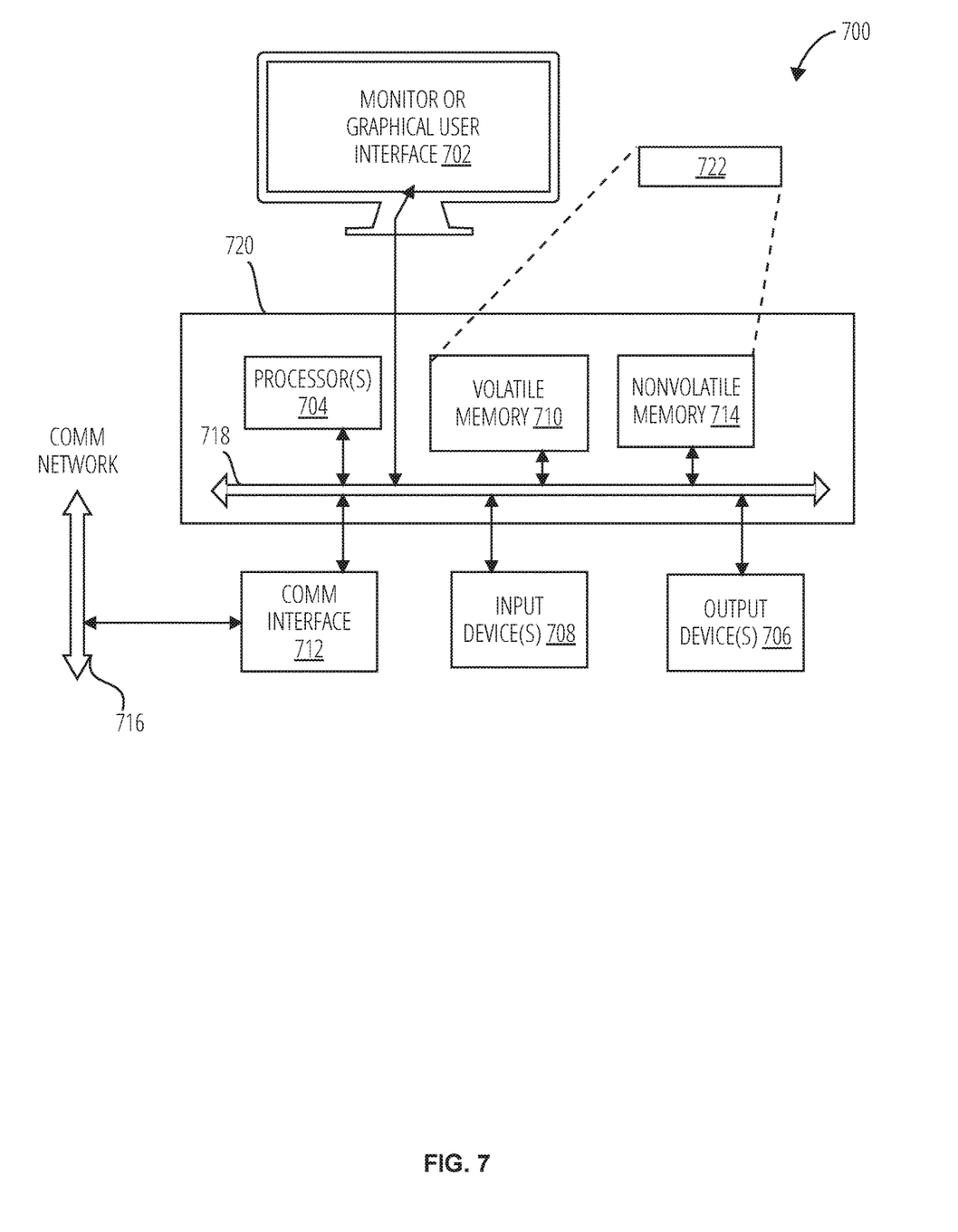
FIG. 7 is an example block diagram of a computing device 700 that may incorporate embodiments of the present invention.

FIG. 7 is an example block diagram of a computing device 700 that may incorporate embodiments of the present invention. FIG. 7 is merely illustrative of a machine system to carry out aspects of the technical processes described herein, and does not limit the scope of the claims. One of ordinary skill in the art would recognize other variations, modifications, and alternatives. In one embodiment, the computing device 700 typically includes a monitor or graphical user interface 702, a data processing system 720, a communication network interface 712, input device(s) 708, output device(s) 706, and the like.

As depicted in FIG. 7, the data processing system 720 may include one or more processor(s) 704 that communicate with a number of peripheral devices via a bus subsystem 718. These peripheral devices may include input device(s) 708, output device(s) 706, communication network interface 712, and a storage subsystem, such as a volatile memory 710 and a nonvolatile memory 714.

The volatile memory 710 and/or the nonvolatile memory 714 may store computer-executable instructions and thus forming logic 722 that when applied to and executed by the processor(s) 704 implement embodiments of the processes disclosed herein.

The input device(s) 708 include devices and mechanisms for inputting information to the data processing system 720. These may include a keyboard, a keypad, a touch screen incorporated into the monitor or graphical user interface 702, audio input devices such as voice recognition systems, microphones, and other types of input devices. In various embodiments, the input device(s) 708 may be embodied as a computer mouse, a trackball, a track pad, a joystick, wireless remote, drawing tablet, voice command system, eye tracking system, and the like. The input device(s) 708 typically allow a user to select objects, icons, control areas, text and the like that appear on the monitor or graphical user interface 702 via a command such as a click of a button or the like.

The output device(s) 706 include devices and mechanisms for outputting information from the data processing system 720. These may include speakers, printers, infrared light-emitting diodes (LEDs), and so on as well understood in the art.

The communication network interface 712 provides an interface to communication networks (e.g., communication network 716) and devices external to the data processing system 720. The communication network interface 712 may serve as an interface for receiving data from and transmitting data to other systems. Embodiments of the communication network interface 712 may include an Ethernet interface, a modem (telephone, satellite, cable, Integrated Services Digital Network (ISDN), (asynchronous) digital subscriber line (DSL), FireWire, Universal Serial Bus (USB), a wireless communication interface such as Bluetooth or WiFi, a near field communication wireless interface, a cellular interface, and the like.

The communication network interface 712 may be coupled to the communication network 716 via an antenna, a cable, or the like. In some embodiments, the communication network interface 712 may be physically integrated on a circuit board of the data processing system 720, or in some cases may be implemented in software or firmware, such as "soft modems", or the like.

The computing device 700 may include logic that enables communications over a network using protocols such as HTTP, TCP/IP, RTP/RTSP, IPX, UDP and the like.

The volatile memory 710 and the nonvolatile memory 714 are examples of tangible media configured to store computer readable data and instructions to implement various embodiments of the processes described herein. Other types of tangible media include removable memory (e.g., pluggable USB memory devices, mobile device subscriber identity module (SIM) cards), optical storage media such as CD-ROMs, DVDs, semiconductor memories such as flash memories, non-transitory read-only-memories (ROMs), battery-backed volatile memories, networked storage devices, and the like. The volatile memory 710 and the nonvolatile memory 714 may be configured to store the basic programming and data constructs that provide the functionality of the disclosed processes and other embodiments thereof that fall within the scope of the present invention.

Logic 722 that implements embodiments of the present invention may be stored in the volatile memory 710 and/or the nonvolatile memory 714 (e.g., to implement flow diagram 200, flow characterization process 300, network security rules generation process 400, service flow rule generation process 500, and/or mirror flow rule generation process 600). Said logic 722 may be read from the volatile memory 710 and/or nonvolatile memory 714 and executed by the processor(s) 704. The volatile memory 710 and the nonvolatile memory 714 may also provide a repository for storing data used by the logic 722.

The volatile memory 710 and the nonvolatile memory 714 may include a number of memories including a main random access memory (RAM) for storage of instructions and data during program execution and a read only memory (ROM) in which read-only non-transitory instructions are stored. The volatile memory 710 and the nonvolatile memory 714 may include a file storage subsystem providing persistent (non-volatile) storage for program and data files. The volatile memory 710 and the nonvolatile memory 714 may include removable storage systems, such as removable flash memory.

The bus subsystem 718 provides a mechanism for enabling the various components and subsystems of data processing system 720 communicate with each other as intended. Although the communication network interface 712 is depicted schematically as a single bus, some embodiments of the bus subsystem 718 may utilize multiple distinct busses.

It will be readily apparent to one of ordinary skill in the art that the computing device 700 may be a device such as a smartphone, a desktop computer, a laptop computer, a rack-mounted computer system, a computer server, or a tablet computer device. As commonly known in the art, the computing device 700 may be implemented as a collection of multiple networked computing devices. Further, the computing device 700 will typically include operating system logic (not illustrated) the types and nature of which are well known in the art.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Conclusion

The present disclosure includes a number of novel and inventive features. Without limitation, the inventive features include systems and methods that automatically generate network traffic filtering (or rate limiting rules), through the passive analysis of samples the network traffic. The filtering rules are comparable and/or complimentary to rules created by a human expert for securing, limiting and/or engineering traffic in a network. Another inventive aspect includes the use of network traffic that is recorded during the operation of the network to automatically generate the security policy for the network.

In addition, a method is disclosed to classify traffic flows into three types, including:
1. Service Flows: In many applications, the traffic communication follows some extension of a client-server model, what this means is that there is a small number of servers, providing a service to one or more clients. The traffic generated from these services can be identified in a couple different ways, using predefined IP addresses, or ports.
2. Mirror Flows: in these flows the source and destination port are identical.
3. Arbitrary Flows: the remaining flows that are not classified as Service Flows or Mirror Flows are labeled as arbitrary flows.

A method is also disclosed that operates on the flows that have been categorized by the three types above, they are analyzed and combined based using the flow type as context. For example, for service flow Rule Construction, the service rules are separated based on the port identified as a service port. For the flows belonging to each client-server pair of this service, the non-service port is determined and then collapsed into a range. The non-service port is the variable with a different value across each of the flows. For mirror flow Rule Construction, for the flows belonging to each client-server pair, the ports are determined and then collapsed into a range. The source and destination ports are identical and share the same range.

In addition, systems and methods are disclosed to extract the traffic flows and classify them as specified above and then construct traffic filtering rules from them. Feedback and approval may be received on the traffic filtering rules before finalizing the rules.

Finally, different examples of the apparatuses and methods disclosed herein include a variety of components, features, and functionalities. It should be understood that the various examples of the apparatuses and methods disclosed herein may include any of the components, features, and functionalities of any of the other examples of the apparatuses and methods disclosed herein in any combination, and all of such possibilities are intended to be within the spirit and scope of the present disclosure. Moreover, many modifications of the examples set forth herein will come to mind to one skilled in the art to which the present disclosure pertains having the benefit of the teachings presented in the foregoing descriptions and the associated drawings. Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

CITATIONS TO BACKGROUND MATERIALS

[1] Karim El Defrawy, Athina Markopoulou, Katerina Argyraki, "Optimal Filter Allocation Against Distributed Denial-of-Service Attacks", The 2007 Information Theory and Applications Workshop (ITA), January 2007, San Diego, Calif.
[2] F. Soldo, K. El Defrawy, A. Markopoulou, B. Krishnamurthy, K. van der Merwe, "Filtering Sources of Unwanted Traffic Based on Blacklists", The 2008 Information Theory and Applications Workshop (ITA), San Diego, Calif., January 2008.
[3] Fabio Soldo, Athina Markopoulou, K. Argyraki, "Optimal Filtering of Source Address Prefixes: Models and Algorithms", in Proc. of IEEE INFOCOM '09, Rio de Janeiro, Brazil, April 2009.
[4] Sergio Pozo, A. J. Varela-Vaca, Rafael M. Gasca, "MDA-Based Framework for Automatic Generation of Consistent firewall ACLs with NAT," Computational Science and Its Applications—ICCSA 2009, Volume 5593 of the series Lecture Notes in Computer Science, pp. 130-144.

What is claimed is:

1. A method for generating network security rules for a network, comprising:
accepting a sample of a plurality of network flows, the plurality of network flows including a service flow, a mirror flow, and a network address translation flow;
classifying at least one network flow of the sample of the plurality of network flows into one of a plurality of flow types, the flow types including a service flow type, a mirror flow type and a network address translation flow type;
combining the at least one network flow of the network flows into one of a plurality of groups of network flows based on the classified flow type of the at least one respective network flow and one or more of a service port, a source port, or a destination port associated with the respective network flow;
automatically generating the network security rules for the network based on the plurality of groups of network flows; and
transforming the network security rules into configuration files sent to one or more devices, the configuration files affecting a machine state of the one or more devices to implement the network security rules;
wherein automatically generating the network security rules comprises generating rate limiting rules for the network based on the groups of network flows, and at least one of a current vehicle status, a vehicle type, or a vehicle usage.

2. The method of claim 1, wherein the flow types comprise the service flow type, the mirror flow type, the network address translation flow type, and an arbitrary flow type.

3. The method of claim 1, further comprising transforming the network security rules into a security policy.

4. The method of claim 1, wherein the one or more devices is a router.

5. The method of claim 1, wherein accepting the sample of a plurality of network flows comprises recording the sample of the network flows of a vehicle.

6. The method of claim 1, wherein classifying each network flow of the sample of the plurality of network flows into one of the plurality of flow types, the flow types including the service flow type, the mirror flow type and the network address translation flow type comprises:
  determining if layer two information associated with the network flow uses to communicate indicates a translation;
    if the layer two information associated with the network flow uses to communicate indicates a translation:
      classifying the network flow as the network address translation flow type;
    if the layer two information associated with the network flow uses to communicate does not indicate a translation:
      determining if a source port or a destination port for the network flow of the network flow is a same source port or destination port of another network flow;
    if the source port or the destination port for the network flow of the network flow is the same source port or destination port of another network flow:
      classifying the network flow as the service flow type;
    if the source port or the destination port for the network flow of the network flow is not the same source port or destination port of another network flow:
      determining if the source port is the same as the destination port;
    if the source port is the same as the destination port, characterizing the network flow as the mirror flow type.

7. The method of claim 1, wherein the vehicle is an aircraft.

8. The method of claim 5, wherein recording the sample of the network flows of the vehicle is performed during operation of the vehicle.

9. The method of claim 5, wherein recording the sample of the network flows of the vehicle is performed during emulation of operation of the vehicle.

10. A non-transitory computer-readable storage medium for generating network security rules for a network, the computer-readable storage medium including instructions that when executed by a computer, cause the computer to:
  accept a sample of a plurality of network flows, the plurality of network flows including a service flow, a mirror flow, and a network address translation flow;
  classify at least one network flow of the sample of the plurality of network flows into one of a plurality of flow types, the flow types including a service flow type, a mirror flow type and a network address translation flow type;
  combine the at least one network flow of the network flows into one of a plurality of groups of network flows based on the classified flow type of the at least one respective network flow and one or more of a service port, a source port, or a destination port associated with the respective network flow;
  automatically generate the network security rules for the network based on the plurality of groups of network flows; and
  transform the network security rules into configuration files sent to one or more devices, the configuration files affecting a machine state of the one or more devices to implement the network security rules;
  wherein the instructions causing the computer to automatically generate the network security rules comprise instructions causing the computer to generate rate limiting rules for the network based on the groups of network flows and at least one of a current vehicle status, a vehicle type, or a vehicle usage.

11. The computer-readable storage medium of claim 10, wherein, the flow type is selected from the group comprising the service flow type, the mirror flow type, the network address translation flow type, and an arbitrary flow type.

12. The computer-readable storage medium of claim 10, wherein the instructions further configure the computer to transform the network security rules into a security policy.

13. The computer-readable storage medium of claim 10, wherein the one or more devices is a router.

14. The computer-readable storage medium of claim 10, wherein the instructions configuring the computer to accept the sample of a plurality of network flows comprises instructions to configure the computer to record the sample of the network flows of a vehicle.

15. The computer-readable storage medium of claim 10, wherein the instructions for classifying each network flow of the sample of the plurality of network flows into one of the plurality of flow types, the flow types including the service flow type, the mirror flow type and the network address translation flow type comprise instructions for:
  determining if layer two information associated with the network flow uses to communicate indicates a translation;
    if the layer two information associated with the network flow uses to communicate indicates a translation:
      classifying the network flow as the network address translation flow type;
    if the layer two information associated with the network flow uses to communicate does not indicate a translation:
      determining if a source port or a destination port for the network flow of the network flow is a same source port or destination port of another network flow;
    if the source port or the destination port for the network flow of the network flow is the same source port or destination port of another network flow:
      classifying the network flow as the service flow type;
    if the source port or the destination port for the network flow of the network flow is not the same source port or destination port of another network flow:
      determining if the source port is the same as the destination port;
    if the source port is the same as the destination port, characterizing the network flow as the mirror flow type.

16. The computer-readable storage medium of claim 10, wherein the vehicle is an aircraft.

17. The computer-readable storage medium of claim 14, wherein recording the sample of the network flows of the vehicle is performed during operation of the vehicle.

18. The computer-readable storage medium of claim 14, wherein recording the sample of the network flows of the vehicle is performed during emulation of operation of the vehicle.

19. A system, comprising:
  a processor;
  a memory, communicatively coupled to the processor, the memory comprising processor instructions including processor instructions for:
  accepting a sample of a plurality of network flows, the plurality of network flows including a service flow, a mirror flow, and a network address translation flow;
  classifying at least one network flow of the sample of the plurality of network flows into one of a plurality of flow types the flow types including a service flow type, a mirror flow type and a network address translation flow type;

combining the at least one network flow of the network flows into one of a plurality of groups of network flows based on the classified flow type of the at least one respective network flow and one or more of a service port, a source port, or a destination port associated with the respective network flow;

generating network security rules for the network based on the plurality of groups of network flows, wherein the network security rules includes rate limiting rules for the network based on the groups of network flows, the rate limiting rules comprising filtering rules and network address translation rules; and transforming the network security rules into configuration files, the configuration files sent to one or more devices to affect a machine state of the one or more devices;

wherein the system is further configured to record the sample of the network flows for a vehicle, and the rate limiting rules are further based on at least one of a current vehicle status, a vehicle type, or a vehicle usage.

20. The system of claim 19, wherein the flow types further include an arbitrary flow.

21. The system of claim 19, wherein the system is configured to record the sample of the network flows of the vehicle during operation of the vehicle.

22. The system of claim 19, wherein the system is configured to record the sample of the network flows of the vehicle during emulation of operation of the vehicle.

23. The system of claim 19, wherein the system is further configured to transform the network security rules into a security policy.

24. The system of claim 19, wherein the processor instructions for classifying each network flow of the sample of the plurality of network flows into one of the plurality of flow types, the flow types including the service flow type, the mirror flow type and the network address translation flow type comprises processor instructions for:

determining if layer two information associated with the network flow uses to communicate indicates a translation;

if the layer two information associated with the network flow uses to communicate indicates a translation:
classifying the network flow as the network address translation flow type;

if the layer two information associated with the network flow uses to communicate does not indicate a translation:
determining if a source port or a destination port for the network flow of the network flow is a same source port or destination port of another network flow;

if the source port or the destination port for the network flow of the network flow is the same source port or destination port of another network flow:
classifying the network flow as the service flow type;

if the source port or the destination port for the network flow of the network flow is not the same source port or destination port of another network flow:
determining if the source port is the same as the destination port;

if the source port is the same as the destination port, characterizing the network flow as the mirror flow type.

25. The system of claim 19, wherein the vehicle is an aircraft.

* * * * *